United States Patent [19]

Hayes et al.

[11] Patent Number: 4,517,083
[45] Date of Patent: May 14, 1985

[54] FILTER DEVICE HAVING RELIEF VALVE FOR USE IN POWER STEERING SYSTEM

[75] Inventors: Willliam Hayes, Elmont, N.Y.; James W. Dohrenwend, Wheaton, Ill.

[73] Assignee: ARC Rebuilders, Inc., Astoria, N.Y.

[21] Appl. No.: 588,540

[22] Filed: Mar. 12, 1984

[51] Int. Cl.³ .............................................. B01D 29/14
[52] U.S. Cl. ...................................... 210/131; 55/313; 55/314
[58] Field of Search ............... 210/131, 167, 130, 132, 210/416.5; 137/843, 859, 852; 422/113, 115; 55/313, 314

[56] References Cited

U.S. PATENT DOCUMENTS

| | | | |
|---|---|---|---|
| 2,192,458 | 3/1940 | Gulick | 210/131 |
| 2,508,952 | 5/1950 | Kline | 210/460 |
| 2,895,613 | 7/1959 | Griffiths | 210/130 |
| 2,949,927 | 8/1960 | Mackal | 137/859 |
| 3,079,946 | 2/1960 | Rosler | 137/859 |
| 3,085,591 | 4/1963 | Schneider | 137/859 |
| 3,176,712 | 9/1962 | Ramsden | 137/859 |
| 3,417,768 | 12/1968 | Wasson | 137/843 |
| 3,662,887 | 5/1972 | Uhlhorn, Jr. | 210/131 |
| 3,790,077 | 2/1974 | Wisyanski et al. | 137/859 |
| 3,804,113 | 4/1974 | Garcea | 137/859 |
| 3,850,190 | 11/1974 | Carlson | 137/859 |
| 4,141,379 | 2/1979 | Manske | 137/859 |
| 4,179,096 | 12/1979 | Fromfield | 251/38 |
| 4,324,097 | 4/1982 | Schmitt et al. | 137/859 |
| 4,379,051 | 4/1983 | Hiesinger et al. | 210/350 |
| 4,406,786 | 9/1983 | Hein | 210/223 |

FOREIGN PATENT DOCUMENTS

| | | | |
|---|---|---|---|
| 2057245 | 10/1971 | Fed. Rep. of Germany | 137/859 |
| 2024427 | 12/1971 | Fed. Rep. of Germany | 137/859 |
| 2450301 | 4/1976 | Fed. Rep. of Germany | 137/859 |
| 2603712 | 8/1977 | Fed. Rep. of Germany | 137/859 |

OTHER PUBLICATIONS

IBM Technical Disclosure Bulletin, J. H. Meiser, "Pneumatic Diode or Check Valve Device", Apr. 1963.

Primary Examiner—Barry S. Richman
Assistant Examiner—Titus B. Ledbetter, Jr.
Attorney, Agent, or Firm—Philip Young

[57] ABSTRACT

A filter device for use in the return line of a power steering system for filtering the fine metal particles in the power steering fluid, thereby minimizing contamination, reducing friction and maintaining normal fluid temperatures. A perforated support plate is mounted between an upper body wall and a lower body wall for separating the housing interior into an inlet chamber and an outlet chamber. A felt filter disc is located in intimate contact with the support plate on the inlet chamber side of such plate for filtering the particles from the inlet fluid prior to the passage of the fluid through the filter and the holes in the support plate into the outlet chamber. A relief valve is provided by the combination of the aligned central opening in both the support plate and the adjacent filter disc together with a boss in the upper body wall which extends into such central opening in sealing engagement against the filter material for closing off the relief valve opening under normal filtering conditions. The flexure of the support plate is designed so that when the filter becomes clogged with particles to cause a build up of fluid pressure by a predetermined amount, the support plate flexes and moves away from the valve boss thereby permitting the fluid to bypass the filter material and pass into the outlet chamber via the relief valve opening.

17 Claims, 8 Drawing Figures

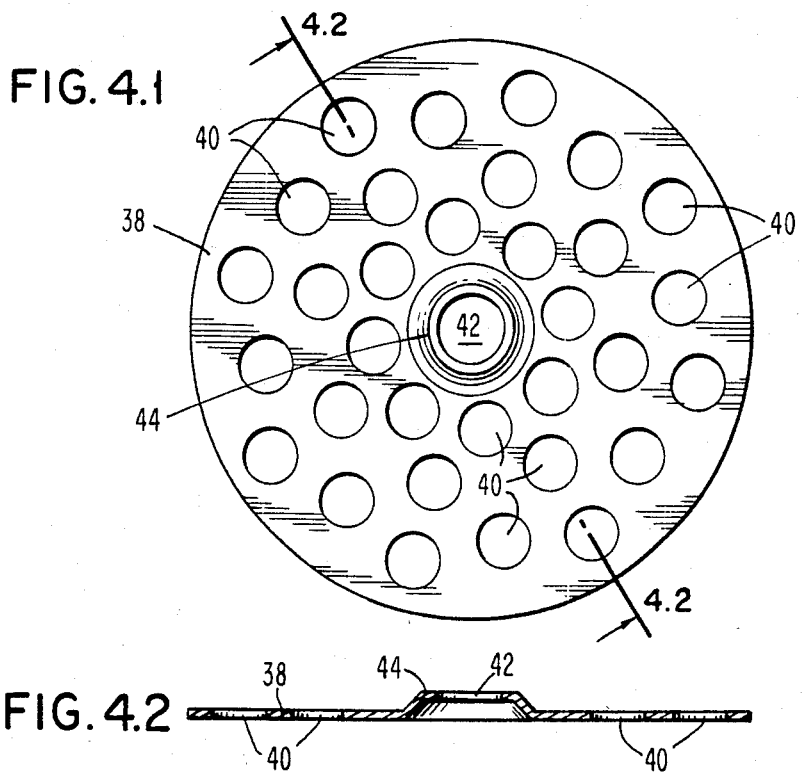
FIG. 4.1
FIG. 4.2
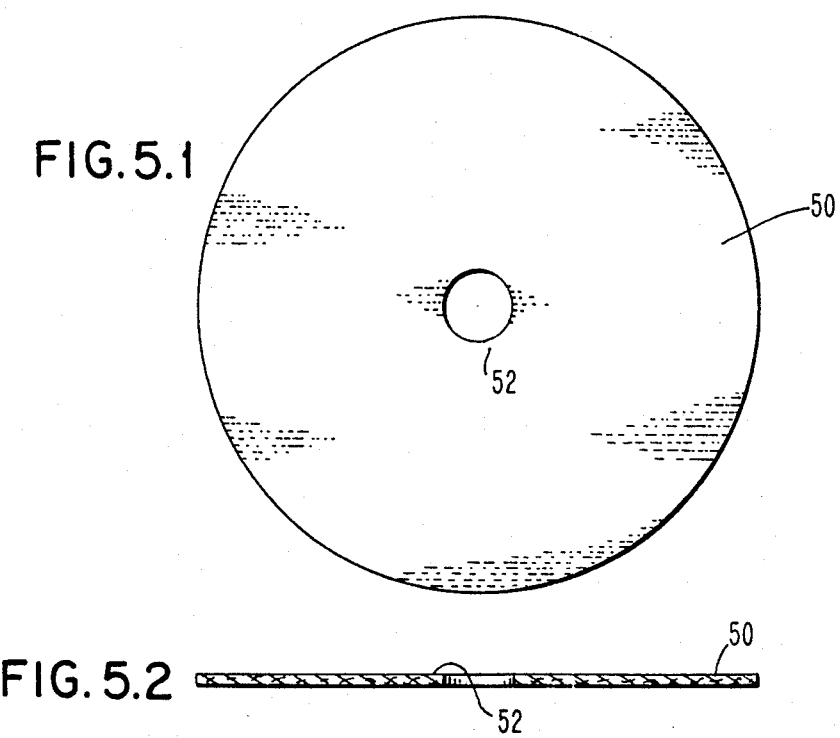
FIG. 5.1
FIG. 5.2

FILTER DEVICE HAVING RELIEF VALVE FOR USE IN POWER STEERING SYSTEM

TECHNICAL FIELD

The present invention relates to automotive filters, and more particularly relates to a filter for removing the fine particles in the fluid of a power steering system with a relief valve incorporated in the filter.

BACKGROUND ART

In the power steering systems of automobiles, solid particles developed through wear of the system parts are present in the fluid causing contamination, increased friction and raised fluid temperatures. These particles also increase deterioration of the hoses and seals. Therefore, it is desirable to refine the power steering fluid by filtering such particles. Presently, there are known filters which employ a paper filtering element together with a relief valve made of a combination spring, valve disc and seat arrangement. Such known filter devices are generally complex, involving the spring and valve seat arrangement, and therefore are expensive to manufacture. Also, such known filter devices are often not reliable due to the spring arrangement employed. There are other known types of filter devices being used in automobiles which are less expensive than the above-noted power steering filter devices but which are not suitable for the same purpose of filtering the fine particles existent in power steering systems and, consequently, such known filters also do not provide adequate and reliable relief valve means in the filter. Examples of such filters devices are the floating oil screens used in the oil sumps of engines as described in U.S. Pat. No. 2,192,432 to Gulick, U.S. Pat. No. 2,508,952 to Kline and U.S. Pat. No. 3,662,887 to Uhlhorn, Jr. Such patents disclose devices mounted or floating in the oil sump of an internal combustion engine to prevent sludge and the like from entering the oil pump. When the screen becomes badly clogged with foreign matter, the suction pull on the screen will open a valve formed by a portion of the screening element and a wall portion to allow oil flow without screening. In such known oil sludge filter devices, the wire screen element is intended for filtering out relatively large particles and sludge and is inappropriate for filtering fine particles, even if the screened mesh openings were made smaller. The screen material is highly flexible and subject to random deformation and, therefore, the screen valve may easily open under unintended variable and minor conditions not due to clogging, such as slight variations in suction pressure and very small build ups of heavy sludge against the very flexible screen causing a suction sufficient to move the screen valve into an open position. Also, the non-rigid nature of the screen material affords it no spring force to return it to its original closed position once the minor suction fluctuation is reduced to normal. This absence of rigidity, or memory, could result in the screen valve opening and remaining open even after the minor suction fluctuation is removed. This random deformation and uncontrolled shifting of the position of the screen element in such oil sludge filters results in a relief valve which cannot be designed for opening under predetermined, controlled conditions of filter clogging. Also, the valve seal formed by an element of the screen with the wall is generally a loose-acting seal made under slight pressures of the screen element on a wall. Thus, such a loose and uncontrolled sealing means as used in these oil sludge filter devices is not suitable for the requirements in filtering the fine particles in a power steering system.

SUMMARY OF THE INVENTION

Therefore, in view of the above it is an object of the present invention to provide a filter device for a power steering system which is simple in structure and operation while efficiently removing the fine particles present in a power steering system. It is another object of the present invention to provide a filter device for power steering system which can remove fine particles while also providing a reliable and accurate relief valve. It is another object to provide a filter device for power steering system with a relief valve that opens when a predetermined build up of pressure occurs in the filter device. It is another object to provide a filter device for a power steering system with a relief valve having a soft seal for preventing fine particles from passing there through during normal filter conditions.

These and other objects are achieved by the present invention which provides a filter device for use in the return line of a power steering system for filtering the metal particles in the power steering fluid, thereby minimizing contamination, reducing friction and maintaining normal fluid temperatures. The filter device includes a housing having an upper body wall and a lower body wall connecting respectively with an inlet tube and an outlet tube for connecting the housing and filter device in fluid communication with the returnline of a power steering unit. A perforated support plate is mounted between the upper body and lower body and separates the housing interior into an inlet chamber and an outlet chamber. A felt filter disc is located in intimate contact with the support plate on the inlet side of such plate for filtering the fine particles from the inlet fluid prior to the passage of the fluid through the filter and the holes in the support plate into the outlet chamber. A relief valve is provided by the combination of the aligned central openings in both the support plate and the adjacent filter disc together with a boss in the upper body wall which extends into such central openings in sealing engagement against the filter disc for closing off the relief valve opening under normal conditions.

The flexure of the support plate is designed so that when the filter becomes clogged with particles the build up of fluid pressure by a predetermined amount in the inlet chamber will cause the support plate to flex and move away from the valve boss thereby permitting the fluid to bypass the filter material and pass into the outlet chamber via the relief valve opening. The designed flexibility in the support plate together with the felt material which both filters the fluid particles as well as seals the relief valve opening during normal filtering operations results in reliability and control of both the filtering and relief valve operations.

BRIEF DESCRIPTION OF THE DRAWINGS

FIG. 4.1 and FIG. 4.2 are a respective top view and a cross-sectional elevation view of the perforated support plate;

FIG. 5.1 and FIG. 5.2 are a respective top view and a cross-sectional elevation view of the filter disc.

DESCRIPTION OF THE PREFERRED EMBODIMENTS

Figure 1:
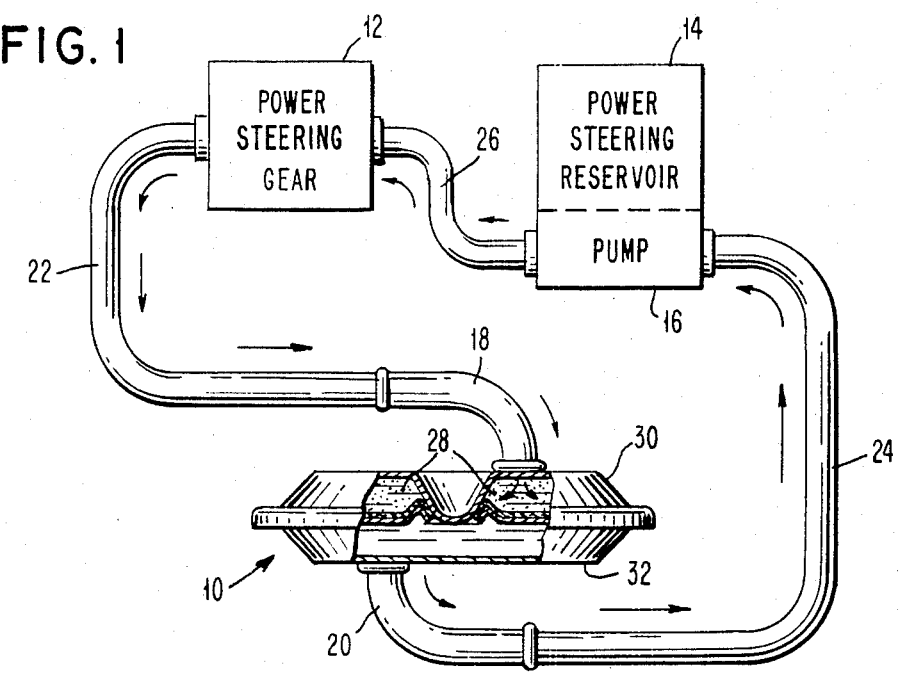
FIG. 1 shows the filter device of the present invention connected in a power steering system with a portion of the filter device being broken away to show the interior thereof.

Referring to FIG. 1 there is shown the filter device 10 connected in a power steering system having a power steering gear 12, and a power steering reservoir 14, for a power steering pump 16. Power steering unit 10 has a housing to which are attached a fluid inlet tube 18 and an outlet tube 20 in the return lines 22 and 24, respectively, for the fluid to the power steering pump 16 and the reservoir 14. Fluid from the power steering pump 16 is communicated to the power steering gear 12 via a fluid line 26 shown. The fine particles suspended in the power steering fluid are indicated by numeral 28 in the broken away view of the filter device 10.

Figure 2:
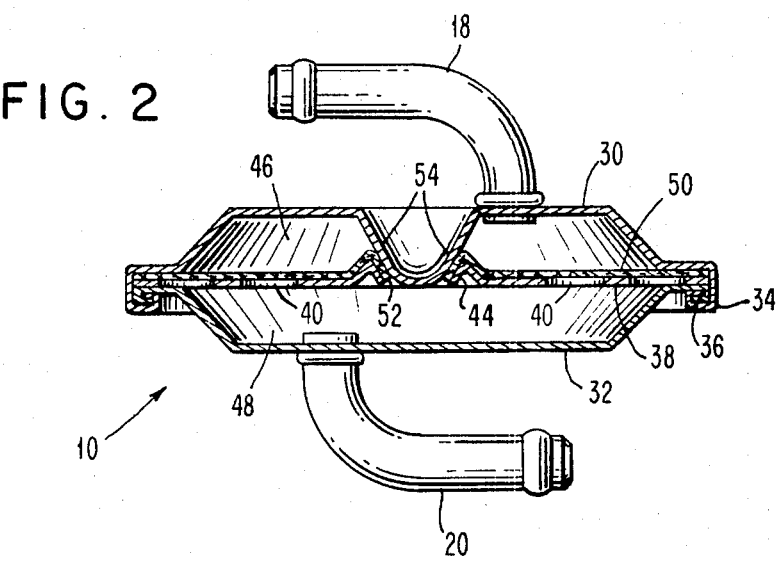
FIG. 2 is a partial cross-sectional view of the filter device taken vertically through the center of the filter device.

Referring to FIG. 2 there is shown a vertical cross section view of the filter device which includes a housing having an upper body wall 30 and a lower body wall 32 having a general pan shape and being joined together in a fluid tight arrangement along the periphery by an interlocking shoulder 34 and flange 36 forming parts of said respective upper and lower body walls 30 and 32. Fluid inlet tube 18 is connected to upper body wall 30 while fluid outlet tube 20 is connected to lower body wall 32. The upper and lower body walls 30 and 32 may, for example, be made of steel.

A support plate 38 is shown in FIG. 4.1 in top view and in FIG. 4.2 in a side view and includes a plurality of spaced apart holes 40 located across most of the surface of the disc-shaped support plate 38. The typical support plate 38 shown in both FIGS. 4.1 and 4.2 may, for example, be made preferably of a cold rolled steel, with a thickness of about 12.5 mils. (0.0125 inches) and a diameter of about 4 inches. At the center of the plate 38 is a large standoff 44 or annular rim 44 surrounding a central valve plate opening 42 and having a generally inverted V-shape. The outer periphery of support plate 38 extends between the shoulder 34 and rim 36 of upper body wall 30 and lower body wall 32. The support plate 38 divides the inside of the filter housing into an inlet or upper chamber 46 and an outlet or lower chamber 48.

Located adjacent to, and in intimate contact with the support plate 38 is a filter material 50 made of a fiber, such as felt, for filtering fine particles which, for example, are larger than about 65-70 microns in size. Referring to FIGS. 5.1 and 5.2, there is shown the filter disc 50 in top view and side view, respectively. As shown in FIG. 2, the filter material 50 is mounted adjacent to the support plate 38 and has a central opening formed by a filter rim 52 which contacts the rim 44 of plate 38 for sealing such opening 42 during normal operating conditions. The filter material 50 extends adjacent the support plate 38 on the inlet chamber side to its outer pheripheral edge which is pressed with such plate 38 between the shoulder 34 and rim 36 of the upper and lower walls 30 and 32.

Figure 3:
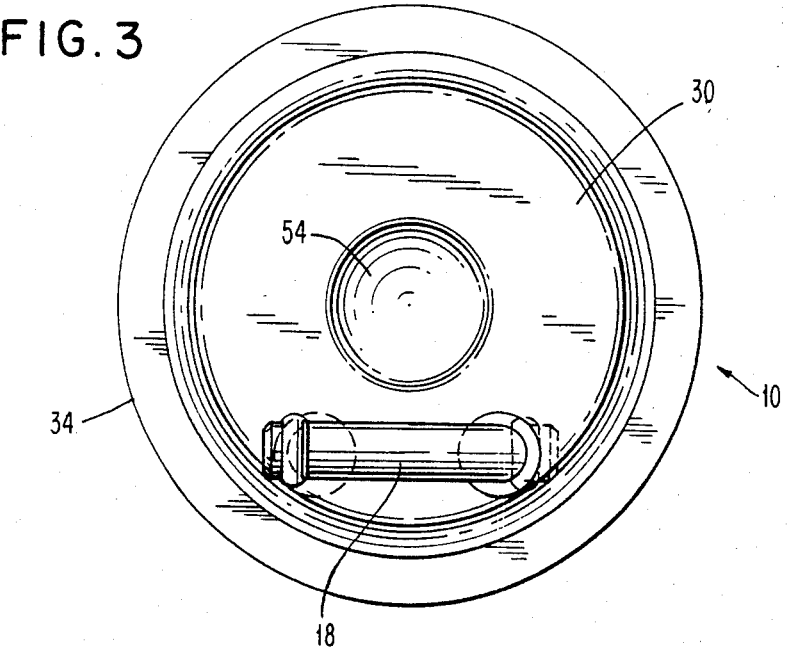
FIG. 3 is a top view of the filter device showing the upper body wall the central valve boss and the fluid inlet tube.

A relief valve is provided by the filter device 10 by means of the combination of a protuberance 54 formed as part of the upper body wall 30 in the central portion and extending, as shown in FIGS. 2 and 3, into the opening defined by both the filter rim 52 and the support plate rim 44. The relief valve is thus formed by the boss 54 which sealingly engages with the filter rim 52 and the support plate rim 44.

Figure 6:
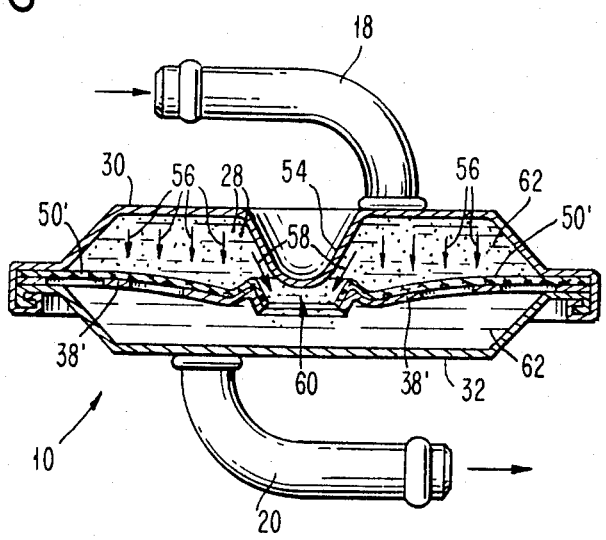
FIG. 6 shows an exaggerated view of the relief valve arrangement shown in FIG. 2, wherein there is indicated the flexed position of the support plate in the open valve position.

Here, it is noted that the support plate 38 is a rigid but yet flexible plate that is designed to flex and bend at is central portion by a predetermined amount of distance when subjected to a given predetermined fluid pressure on such plate 38. The thin plate 38, described in the example of being made of cold rolled steel, has a thickness of about 12.5 mils and, together with the number and size of the holes 40 in the plate 38, will flex and bend outwardly at the center portion by a predetermined amount under the power steering system pressure. More particularly, FIG. 6 illustrates the valve operation by a close up and exaggerated view of the relief valve formed by the boss 54, the support plate 38 and the felt filter 50. Under normal operating conditions when the filter material 50 is filtering out particles from the fluid in the upper inlet chamber 46, the fluid passes through the filter 50 and holes 40 of plate 38 into the lower output chamber 48 where it exits through outlet tube 20. However, should the filter 50 become clogged with the filtered particles such that the pressure in inlet chamber 46 builds to a predetermined amount indicated by the pressure flow arrows 56 in FIG. 6, the support plate 38 will be forced in the direction shown into the position indicated by numeral 38' while the filter material 50 is caused by the pressure to also remain in intimate contact with plate 38 and move into the position indicated by numeral 50'. Such plate movement produces a valve opening 60 whereby the fluid 62 is provided with a relief passage indicated by arrows 58 in such valve opening 60. It is noted that the sealing arrangement is designed to operate under a positive predetermined pressure which builds up under a filter clogging condition such that the flexible plate 38 will move a predetermined distance under such pressure to cause the relief valve opening 60. Under normal operating conditions when the filter is not clogged, minor differences in fluid pressure in the input chamber 46 and, consequently, differences in the differential pressure between input chamber 46 and outlet chamber 48 are such that the relief valve will not accidentally open. This is because of the design of the flexible support plate which has a spring tension that has been set to flex at a predetermined pressure for opening the valve. Furthermore, support plate 38 has a flexible, but, rigid plate characteristic that tends to maintain such plate in a closed valve position under normal fluid pressure conditions when the filter material 50 is not clogged.

While the invention has been described above with respect to its preferred embodiments, it should be understood that other forms and embodiments may be made without departing from the spirit and scope of the present invention. For example, while the filter device of the present invention has been described with respect to power steering units, particularly, for automobiles, it is contemplated that such filter device and relief valve may also be used in other applications such as automatic transmissions of both automobiles and other motor driven equipment wherein it is desirable to remove the fine particles accumulating in the fluid.

What is claimed:

1. A filter device for filtering the fine solid particles present in the fluid line of an automotive system comprising:
   a filter housing including an upper body wall and a lower body wall, inlet means for receiving fluid in said housing, and outlet means for passing fluid out of said housing into said fluid system;
   a perforated support plate comprising a thin, disc-shaped substantially rigid material designed to flex when subjected to a predetermined pressure, said support plate being mounted in said filter housing and extending across the interior of said housing for separating said housing into an inlet chamber and an outlet chamber, said support plate having a plurality of perforations for passing filtered fluid from said inlet chamber to said outlet chamber, and said support plate having a valve opening therein defined by a rim which together constitute a relief valve opening for said fluid and valve seat;
   a disc-shaped filter material for filtering solid particles of a given size from said fluid, said filter material being located in said inlet chamber and covering each of said perforations in intimate contact with said support plate for filtering said particles prior to the passage of fluid through said filter material and said perforations to said outlet chamber, said filter material having a means defining a valve opening therein which is positioned in alignment with said valve opening in said support plate;
   said upper body wall having a boss portion which extends through said inlet chamber and into said valve openings in both said filter material and said support plate, said boss portion pressing said filter material against said valve seat rim of said support plate to thereby seal off said valve opening from said particles under normal filtering conditions;
   said support plate being designed to flex upon the buildup of a predetermined amount of fluid pressure in said inlet chamber when said filter material becomes clogged with said particles such that the support plate will be caused to move away from said valve boss portion to open said relief valve and permit fluid to bypass said filter material and pass into said outlet chamber.

2. A filter device as recited in claim 1, wherein said filter material comprises a disc of felt material.

3. A filter device as recited in claim 1, wherein said support plate has a thickness of about 10–15 thousandths of an inch.

4. A filter device as recited in claim 1 wherein said valve opening formed by said aligned openings in said filter material and said support plate is located in the centers of said filter material and said support plate.

5. A filter device as recited in claim 1, wherein said filter material has a diameter which is the same as the diameter of said support plate, said housing formed by upper and lower body housing portions forming the respective upper and lower body walls, means joining the mating peripheral ends of said housing portions together and wherein both said filter material and said support plate are mounted in said filter device with their respective peripheral portions pressed between the joined ends of said upper body housing portion and said lower body housing portion.

6. A filter device as recited in claim 1, wherein said rim of said support plate which is formed around said valve opening comprises an annular rim having an inverted V-shaped cross-section providing an annular portion.

7. A filter device as recited in claim 6, wherein said means defining a valve opening in said filter material comprises an annular rim of filter material formed around said valve opening of said filter material positioned to be interposed between said annular rim forming said valve opening of said support plate and said valve boss to provide a soft seal in said relief valve.

8. A filter device for filtering the fine solid particles present in the fluid line of an automotive system comprising:
   a filter housing including an upper body wall and a lower body wall, said upper body wall being connected to an inlet tube for receiving fluid in said housing, said lower body wall being connected to an outlet tube for passing fluid out of said housing into said fluid system;
   a perforated support plate comprising a thin, disc-shaped substantially rigid material designed to flex when subjected to a predetermined pressure, said support plate being mounted between said upper body wall and said lower body wall and extending across the interior of said housing for separating said housing into an inlet chamber and an outlet chamber, respectively, said support plate having a plurality of perforations for passing filtered fluid from said inlet chamber to said outlet chamber, and said support plate having a valve opening therein formed by an annular rim around said valve opening and constituting a valve seat member of a relief valve;
   a disc-shaped filter material for filtering said solid fine particles of a given size from said fluid, said filter material being located in said inlet chamber in intimate contact with said support plate and covering each of said performations in said support plate for filtering said particles prior to the passage of fluid through said filter material and said perforations in said support plate to said outlet chamber, said filter material being made of a soft flexible material for both filtering said particles and for sealing said relief valve and having a valve opening defined by an annular rim of said filter material which is in alignment with said valve opening in said support plate and forms a tight seal of said relief valve against said fine particles;
   said upper body wall having a boss portion which extends into said inlet chamber and covers said valve openings in both said filter material and said support plate, said boss portion constituting a valve plug which presses said annular rim of filter material against said valve seat of said support plate to thereby seal off said valve openings from said particles under normal filtering conditions;
   said support plate being designed to flex upon the buildup of a predetermined amount of fluid pressure in said inlet chamber when said filter material becomes clogged with said particles such that the support plate will be caused to move away from said boss portion to open said relief valve and permit fluid to bypass said filter material and pass into said outlet chamber.

9. A filter device as recited in claim 8 wherein said upper body wall and said lower body wall are separate housing portions, means adjoining said housing portions at the peripheral ends thereof and wherein said support plate is fixedly mounted between said adjoining peripheral ends.

10. A filter device as recited in claim 8 wherein said support plate is designed to flex and open said relief valve when a pressure of about 45 pounds per square inch or more is exerted in said inlet chamber against said support plate.

11. A filter device as recited in claim 8 wherein said valve opening formed by said aligned openings in said filter material and said support plate is located in the centers of said filter material and said support plate.

12. A filter device as recited in claim 8 wherein said filter material has a diameter which is the same as the diameter of said support plate, said housing formed by upper and lower body housing portions forming the respective upper and lower body walls, means joining the mating peripheral ends of said housing portions together and wherein both said filter material and said support plate are mounted in said filter device with their respective peripheral portions pressed between the joined ends of said upper body housing portion and said lower body housing portion.

13. A filter device as recited in claim 8 wherein said filter material comprises a disc of felt material.

14. A filter device as recited in claim 8 wherein said filter material is designed to filter out particles having a size greater than about 65 microns.

15. A filter device as recited in claim 8, wherein said annular rim of said support plate, which is formed around said valve opening, has an inverted V-shaped cross-section.

16. A filter device as recited in claim 8 wherein said support plate comprises a thin disc made of steel having a plurality of holes forming said perforations therein, said support plate forming a control valve member which flexes upon the application of a predetermined pressure thereto.

17. A filter device as recited in claim 16 wherein said support plate has a thickness of about 10-15 thousandths of an inch.

* * * * *